United States Patent
Alluri et al.

(10) Patent No.: US 12,326,898 B2
(45) Date of Patent: Jun. 10, 2025

(54) SYSTEM AND METHOD FOR RECOMMENDING BACKGROUND MUSIC FOR BOOKS USING MACHINE LEARNING MODELS

(71) Applicant: International Institute of Information Technology, Hyderabad, Hyderabad (IN)

(72) Inventors: Vinoo Alluri, Hyderabad (IN); Pranshi Yadav, Lucknow (IN); Divy Kala, Nainital (IN); Nisarg Mankodi, Ahmedabad (IN); Shivani Hanji, Mumbai (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 257 days.

(21) Appl. No.: 17/985,043

(22) Filed: Nov. 10, 2022

(65) Prior Publication Data

US 2023/0141104 A1    May 11, 2023

(30) Foreign Application Priority Data

Nov. 11, 2021 (IN) .............................. 202141051845

(51) Int. Cl.
*G06F 16/63*    (2019.01)
*G06N 20/00*    (2019.01)

(52) U.S. Cl.
CPC ............. *G06F 16/63* (2019.01); *G06N 20/00* (2019.01)

(58) Field of Classification Search
CPC ................................ G06F 16/63; G06N 20/00
See application file for complete search history.

(56) References Cited

U.S. PATENT DOCUMENTS

2017/0011279 A1* 1/2017 Soldevila ............ G06F 16/5846
2019/0138546 A1* 5/2019 Jung ..................... G06F 16/683
2020/0135158 A1* 4/2020 Yao ......................... G06F 16/36

* cited by examiner

*Primary Examiner* — Kannan Shanmugasundaram

(57) ABSTRACT

A system and a method for recommending background music that corresponds to an extracted text from a book based on emotion and a topic that is relevant to the extracted text using machine learning models provided. The method includes, (i) determining, using a first trained machine learning model, the emotion from the extracted text that corresponds to the paragraph of the book, (ii) assigning, using a word similarity technique, a similarity score for emotion-words based on the emotion, (iii) determining the emotion-words that exceed a threshold to obtain a subset of emotion-words, (iv) determining a query using the subset of the emotion-words and the emotion, (v) retrieving, using the query, songs that match any of words in the query, and (vi) recommending background music based on top-ranked songs for the extracted text from the book.

3 Claims, 6 Drawing Sheets

SYSTEM AND METHOD FOR RECOMMENDING BACKGROUND MUSIC FOR BOOKS USING MACHINE LEARNING MODELS

CROSS-REFERENCE TO PRIOR-FILED PATENT APPLICATIONS

This application claims priority from the Indian provisional application no. 202141051845 filed on Nov. 11, 2021, which is herein incorporated by reference.

TECHNICAL FIELD

The embodiments herein generally relate to natural language processing, more particularly to a system and method for recommending background music for books based on NLP features extracted from the text, including, but not limited to, emotions conveyed in the text and topics under discussion in the text using machine learning models.

DESCRIPTION OF THE RELATED ART

Music is a classic expression of human emotions; it can be seen as another language to express an artist's thoughts and feelings. One of the most prominent effects of music is its impact on the emotions of the listeners. This can be observed in the usage of background music in narrative-driven works, such as movies and video games, to enhance the audience's experience. Music can be conceived as an independent exclusively auditory medium—and consuming music in this form can be called "music alone", but music is also consumed in the form of multimedia, as one dimension of a holistic experience. For example, in video games, background music has been shown to improve players' immersion and narrative experience. In movies, background music has powerful aesthetic effects on the perception and understanding of screen content. Music has an important role to play in multimedia, and therefore, appropriate background music that complements a book can further enhance the reading experience. However, composing, or even compiling a playlist manually for a book is a laborious task—and hence a system for automating this process is presented.

One existing technique for recommending background music for books calculates the density of emotional words associated with text in the book. Based on the calculated density of emotion words, the values of tempo, scale, octave, and the sequence of notes for the background music are generated using a rule-based approach. However, this technique fails to consider the context of the book due to a lack of analysis of the text at the sentence or paragraph level, and therefore it does not scale well for larger texts.

Another existing technique extracts semantic concepts from the text and uses this information to form search queries, to retrieve appropriate background music from online music/sound libraries. The search queries are given as an input to a library, and the sounds retrieved are arranged by the system to form a track. However, this technique does not use social tags, which are most representative of how users perceive a track, to find the most suitable pieces of music.

Another existing method extracts topics using TF-IDF and uses an open-source library named Syuzhet for sentiment analysis at the sentence level. It uses synthesizer-based sounds to incorporate timbre along with rule-based music generation. However, it does not consider the genre of the song during retrieval, which can affect the suitability of the music piece, and it also fails to analyze text at the paragraph level—which renders it impractical for use in larger texts such as books.

Accordingly, there remains a need for a system to recommend background music for books and address the aforementioned technical drawbacks in existing technologies.

SUMMARY

In view of the foregoing, an embodiment herein provides a method for recommending background music that corresponds to an extracted text from at least one book based on at least one emotion and at least one topic that is relevant to the extracted text using machine learning models. The method includes (a) determining, using a first trained machine learning model, the at least one emotion from the extracted text that corresponds to at least one paragraph of the at least one book, (b) assigning, using a word similarity technique, a similarity score for one or more emotion-words based on the at least one emotion, (c) determining the one or more emotion-words that exceed a threshold to obtain a subset of emotion-words, (d) determining a query using the subset of the emotion-words and the at least one emotion, (e) retrieving, using the query, songs that match any one of words in the query, each song includes at least one tag, and (f) recommending background music based on top-ranked songs for the extracted text from the at least one book.

In some embodiments, the method further includes training the first machine learning model by correlating historical words with historical emotions to obtain the first trained machine learning model.

In some embodiments, the method further includes ranking, using a similarity metric mechanism, the songs that are retrieved by computing a similarity metric between the at least one tag for each song, and at least one topic that is relevant to the extracted text, the at least one topic of the extracted text is determined by a topic modelling technique.

In some embodiments, the similarity metric is computed by grouping a set of words into one or more groups, the one or more groups are arranged in a hypernym hierarchy, the set of words are related to the one or more tags and the at least one topic.

In some embodiments, the similarity metric is computed on a pair of words that are selected from the set of words by, (a) selecting a pair of groups from the one or more groups in which the pair of words are present, (b) choosing a least common sub-sumer of the pair of groups to determine a depth of the least common sub-sumer of the pair of groups, and (c) calculating double the depth of the least common sub-sumer of the pair of groups to obtain a result and dividing the result by a sum of depths of the pair of groups.

In some embodiments, further includes training the second machine learning model by correlating historical songs with historical tags to obtain the second trained machine learning model.

In another aspect, there is provided a system for recommending background music that corresponds to an extracted text from at least one book based on at least one emotion and at least one topic that is relevant to the extracted text using machine learning models. The system includes a processor and a memory that stores a set of instructions, which when executed by the processor, causes to perform: (a) determining, using a first trained machine learning model, the at least one emotion from the extracted text that corresponds to at least one paragraph of the at least one book, (b) assigning, using a word similarity technique, a similarity score for one or more emotion-words based on the at least one emotion, (c) determining the one or more emotion-words that exceed a threshold to obtain a subset of emotion-words, (d) determining a query using the subset of the emotion-words and the at least one emotion, (e) retrieving, using the query, songs that match any one of words in the query, each song includes at least one tag, and (0 recommending background music based on top-ranked songs for the extracted text from the at least one book.

In some embodiments, the processor is configured to train the first machine learning model by correlating historical words with historical emotions to obtain the first trained machine learning model.

In some embodiments, the processor is configured to rank, using a similarity metric mechanism, the songs that are retrieved by computing a similarity metric between the at least one tag for each song, and at least one topic that is relevant to the extracted text, the at least one topic of the extracted text is determined by a topic modelling technique, In some embodiments, the similarity metric is computed by grouping a set of words into one or more groups, the one or more groups are arranged in a hypernym hierarchy, the set of words are related to the one or more tags, and the at least one topic.

In some embodiments, the similarity metric is computed on a pair of words that are selected from the set of words by, (a) selecting a pair of groups from the one or more groups in which the pair of words are present, (b) choosing a least common sub-sumer of the pair of groups to determine a depth of the least common sub-sumer of the pair of groups, and (c) calculating double the depth of the least common sub-sumer of the pair of groups to obtain a result and dividing the result by a sum of depths of the pair of groups.

In some embodiments, the processor is configured to train the second machine learning model by correlating historical songs with historical tags to obtain the second trained machine learning model.

In another aspect, there is provided one or more non-transitory computer-readable storage mediums storing the one or more sequences of instructions, which when executed by the one or more processors, causes performing a method for recommending background music that corresponds to an extracted text from at least one book based on at least one emotion and at least one topic that is relevant to the extracted text using machine learning models. The method includes (a) determining, using a first trained machine learning model, the at least one emotion from the extracted text that corresponds to at least one paragraph of the at least one book, (b) assigning, using a word similarity technique, a similarity score for one or more emotion-words based on the at least one emotion, (c) determining the one or more emotion-words that exceed a threshold to obtain a subset of emotion-words, (d) determining a query using the subset of the emotion-words and the at least one emotion, (e) retrieving, using the query, songs that match any one of words in the query, each song includes at least one tag, and (f) recommending background music based on top-ranked songs for the extracted text from the at least one book.

In some embodiments, further includes training the first machine learning model by correlating historical words with historical emotions to obtain the first trained machine learning model.

In some embodiments, further includes ranking, using a similarity metric mechanism, the songs that are retrieved by computing a similarity metric between the at least one tag for each song, and at least one topic that is relevant to the extracted text, the at least one topic of the extracted text is determined by a topic modelling technique.

In some embodiments, the similarity metric is computed by grouping a set of words into one or more groups, the one or more groups are arranged in a hypernym hierarchy, the set of words are related to the one or more tags and the at least one topic.

In some embodiments, the similarity metric is computed on a pair of words that are selected from the set of words by, (a) selecting a pair of groups from the one or more groups in which the pair of words are present, (b) choosing a least common sub-sumer of the pair of groups to determine a depth of the least common sub-sumer of the pair of groups, and (c) calculating double the depth of the least common sub-sumer of the pair of groups to obtain a result and dividing the result by a sum of depths of the pair of groups.

In some embodiments, further includes training the second machine learning model by correlating historical songs with historical tags to obtain the second trained machine learning model.

A system and method for recommending background music for books is provided. The system allows readers to read books along with recommended background music to enhance the reading experience. The system uses domain knowledge to prioritize certain genres, styles, tags, instruments, etc., of music for making recommendations, as they may be more appropriate for listening while reading. The system ranks the retrieved songs based on social tags of songs and topics of the text in the book.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
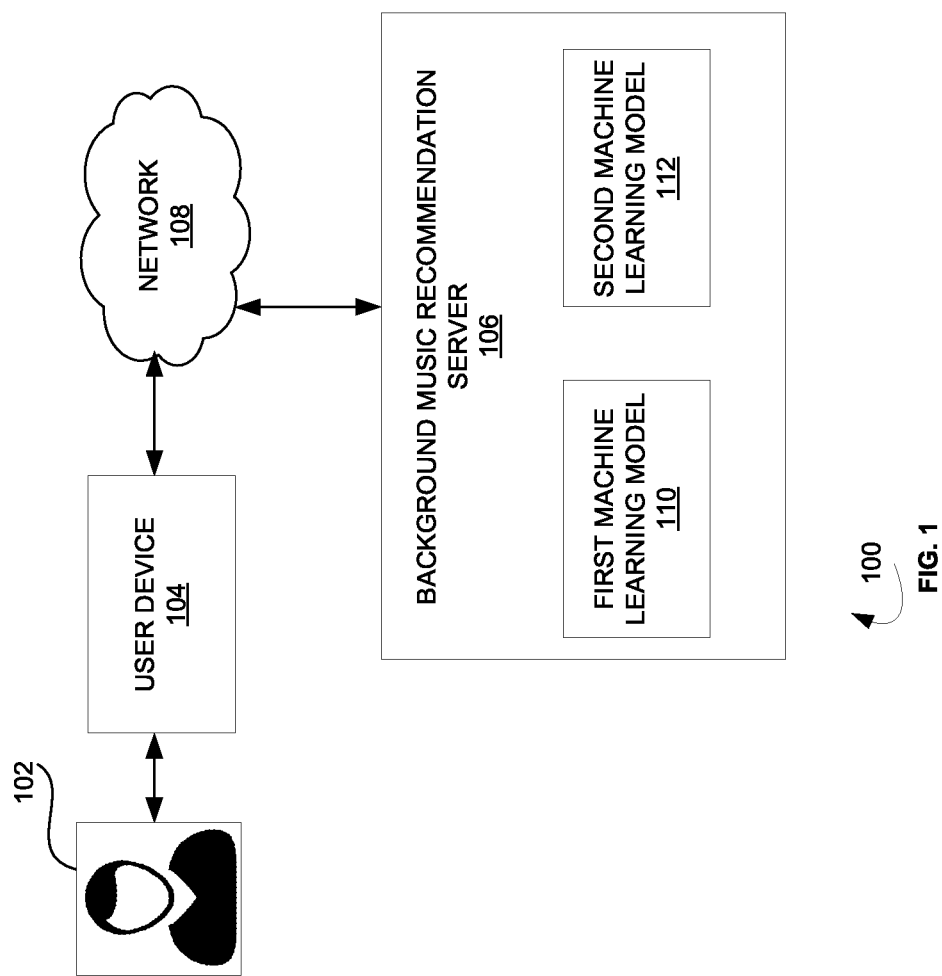
FIG. 1 is a block diagram that illustrates a system for recommending background music that corresponds to an extracted text from a book based on emotion and a topic that is relevant to the extracted text using machine learning models according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for recommending background music that corresponds to an extracted text from a book based on emotion and a topic that is relevant to the extracted text using machine learning models to enhance user experience while reading. Referring now to the drawings, and more particularly to FIGS. 1 through 5, where similar reference characters denote corresponding features consistently throughout the figures', preferred embodiments are shown.

FIG. 1 illustrates a system 100 for recommending background music that corresponds to an extracted text from a book based on an emotion and a topic that is relevant to the extracted text using machine learning models 110, and 112 according to some embodiments herein. The system 100 includes a user device 104 associated with a user 102, and a background music recommendation server 106. A list of devices that are capable of hosting the background music recommendation server 106, without limitation, may include one or more large computers, laptops, tablet devices, smartphones, mobile communication devices, personal digital assistants, or any other such computing device.

The user device 104, without limitation, may include a mobile phone, a kindle, a PDA (Personal Digital Assistant), a tablet, a music player, a computer, an electronic notebook, or a smartphone. The background music recommendation server 106 may communicate with the user device 104 through a network 108. In some embodiments, the background music recommendation server 106 resides on local machines where the music database is stored and queried locally. In some embodiments, the network 108 is a wireless network. In some embodiments, the network 108 is a combination of a wired network and a wireless network. In some embodiments, the network 108 is the Internet. The background music recommendation server 106 receives a book from the user device 104 associated with the user 102. The background music recommendation server 106 may extract text from the book. The text may include at least one paragraph, a few sentences, one or more pages, or a combination of any. The background music recommendation server 106 may extract a context of the extracted text using the natural language processing techniques. The background music recommendation server 106 determines an emotion from the extracted text using a first trained machine learning model. The emotion may be classified using state-of-the-art language models. Further, the emotion of the text is recognized through types of feelings such as happiness, sadness, anger, surprise, fear, and disgust. The first trained machine learning model is determined by training a first machine learning model 110 by correlating historical words with historical emotions to obtain the first trained machine learning model. The first trained machine learning model classifies the paragraph into emotions, such as, Fear', 'Neutral', 'Sad', 'Anger', 'Love', 'Joy' at an accuracy using micro-F1 score of 52.3%. The micro-F1 score may be used to assess a quality of multi-class classification problems of the first trained machine learning model.

The background music recommendation server 106 determines one or more emotion words based on the emotion that is determined. The one or more emotion words are the words that resemble the emotion that is determined. For example, if the first trained machine learning model determines the emotion as happiness, then the one or more emotion-words may be joy, contentment, joyful, cheerful, pleasure, bliss, gladness, merriment, ecstasy, satisfaction, glee, elation, well-being, good cheer, etc.

The background music recommendation server 106 assigns a similarity score for the one or more emotion words using a word similarity technique. The word similarity technique may provide text similarity by calculating how two words are close to each other. The word similarity technique may be, but not limited to, path similarity, Leacock-Chodorow similarity, or Wu-Palmer similarity.

The background music recommendation server 106 determines the one or more emotion words that exceed a threshold to obtain a subset of emotion words. The similarity score may range from 0 and 1. For example, if the threshold similarity score is 0.8, if the similarity score of the emotion word "cheerfulness" is 0.93, the similarity score of the emotion word "joyful" is 0.91, and the similarity score of the emotion-word "bliss" is 0.45, then the subset of emotion-words that are determined may be cheerfulness, joyful, etc.

The background music recommendation server 106 determines a query using the subset of the emotion-words and the at least one emotion. For example, the query for the emotion happiness is "cheerfulness, joyful, happiness".

The background music recommendation server 106 retrieves songs that match any of words in the query. The songs may be retrieved from music libraries based on domain knowledge (about genres, tags, etc.). The domain knowledge may include genres, tags, etc. Each song is assigned with at least one tag. The tag is assigned to each song by at least one of a human or a second trained machine learning model. The second trained machine learning model 112 is trained by correlating historical songs with historical tags. If all the tags are assigned by the human, then the tags are known as social tags.

The second trained machine learning model 112 is trained to predict one or more tags for each song when tags are not already available for any song. For example, if there is no tag available for a song, then the second trained machine learning model 112 predicts a suitable tag based on the acoustic characteristics of the song. The acoustic characteristics may be, for example, acousticness, danceability, duration, energy, instrumentalness, loudness, etc.

The background music recommendation server 106 ranks the songs that are retrieved by computing a similarity metric between the tag for each song, and a topic that is relevant to the extracted text. The similarity metric is computed by grouping a set of words into groups. For example, the synonyms of the word happy are grouped as the set of words. The set of words may be the set of words in a language. The groups are arranged in a hypernym hierarchy. The set of words is related to the one or more tags and the at least one topic. The hypernym is a broad sub-ordinate label whose meaning includes a group of other words. For example, color is a hypernym of red. The hypernym hierarchy includes an arrangement of the group of the words with the broad sub-ordinate label. For example, the arrangement of violet, indigo, blue, green, yellow, orange, and red, based on the wavelengths with the label color.

The similarity metric is computed on a pair of words by considering a pair of groups from the groups in which the pair of words are present. The double depth of the least common sub-sumer of the pair of groups is calculated to obtain a result and dividing the result by a sum of depths of the pair of groups to obtain the similarity metric. For example, the similarity metric between topics and tags is computed based on a lexical database of words that are arranged in hypernym/hyponym taxonomy, for example, the lexical database is WordNet database. The synonyms in WordNet database may be grouped into synsets.

The similarity metric, for example, Wu-Palmer similarity, may be computed on a pair of words in the lexical database (WordNet) by taking the pair of synsets the words belong to, and then taking the double of the depth of the least common sub-sumer of the two synsets to obtain a result, and dividing the result by the sum of the depths of the two synsets.

The background music recommendation server 106 extracts at least one topic from the text using a topic modelling technique. The topic may include, but not limited to, war, science, politics, bright day, fragrant grass, etc. The topic modelling technique may include Latent Dirichlet Allocation (LDA), Non-negative matrix factorization (NMA), or techniques which use neural networks to determine the topic of texts, collectively known as neural topic models.

The background music recommendation server 106 ranks the retrieved songs based on social tags of music and topics extracted from the text earlier. The background music recommendation server 106 recommends background music based on top-ranked songs for the extracted text from the book and the topic that is relevant to the extracted text. The background music recommendation server 106 selects any of the top ranking song as the background music for the extracted text.

Figure 2:
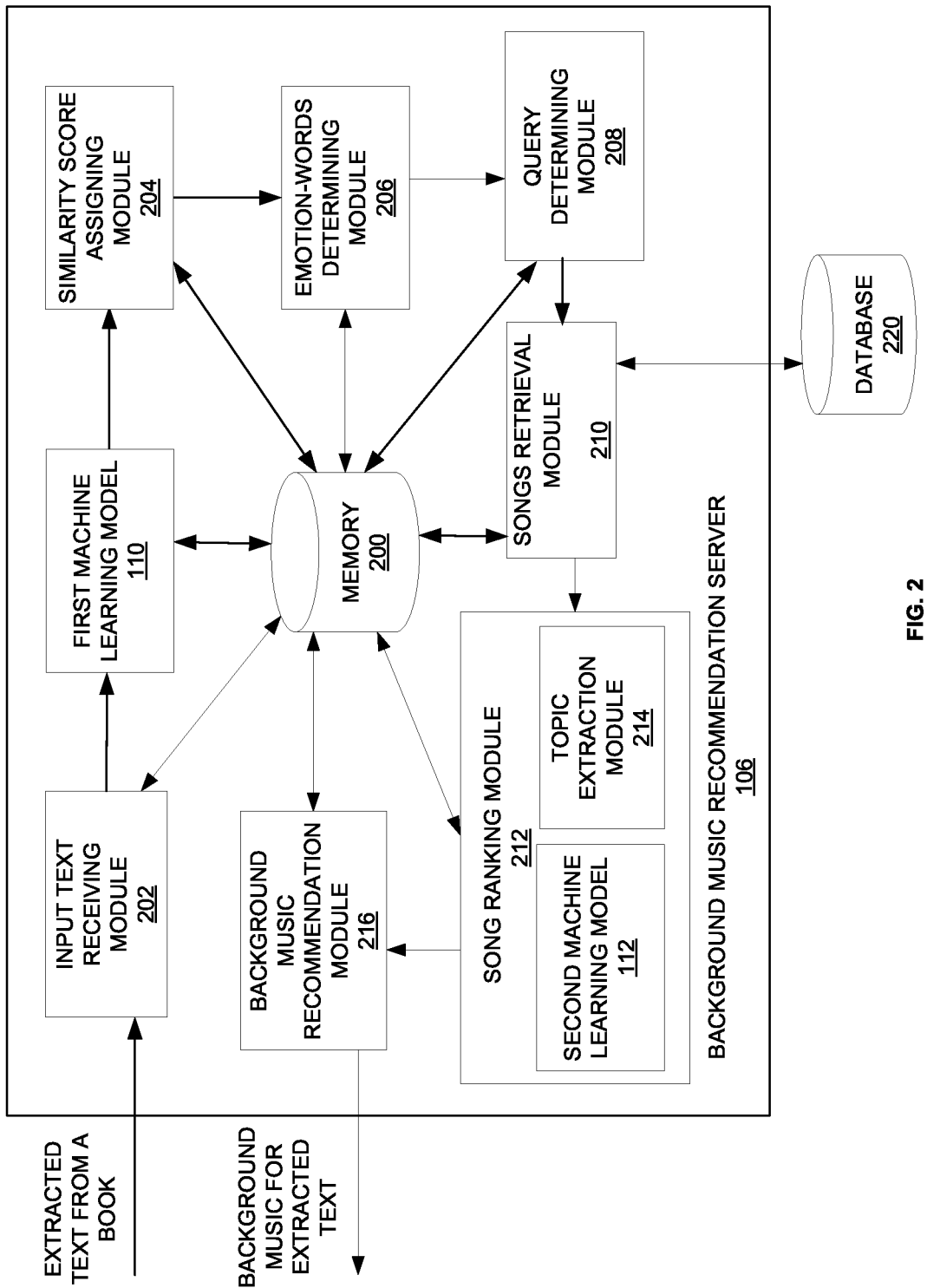
FIG. 2 is a block diagram of a background music recommendation server of the system in FIG. 1 according to some embodiments herein.

FIG. 2 illustrates a block diagram of a background music recommendation server 106. The block diagram of the background music recommendation server 106 includes an emotion extraction module 202, a topic extraction module 204, the first trained machine learning model 110, an emotion-words determining module 206, a memory 200, a query determining module 208, a songs retrieval module 210, a song ranking module 212, the second trained machine learning model 112, a topic extraction module 214, a background music recommendation module 216, and a database 220. In some embodiments, the database 220 is a library of songs. In some embodiments, the library of songs may be hosted online or offline. The database 220 is communicatively coupled with the background music recommendation server 106.

The memory 200 stores a set of instructions, which when executed by a processor of the background music recommendation server 106.

The emotion extraction module 202 receives text of a book from a user device 104 associated with a user 102. The text may include at least one paragraph, a few sentences, one or more pages, or a combination of any. The first trained machine learning model 110 extracts at least one emotion from the paragraph of the text based on paragraph-level natural language processing (NLP) features. The emotion is detected using emotion classification of the text. The emotion of the text is recognized through types of feelings such as happiness, sadness, anger, surprise, fear, and disgust.

The similarity score assigning module 204 determines one or more emotion-words based on the emotion that is determined. The one or more emotion-words are the words that resemble the emotion that is determined.

The similarity score assigning module 204 assigns a similarity score for the one or more emotion-words using a word similarity technique.

The emotion-words determining module 208 determines the one or more emotion-words that exceed a threshold to obtain a subset of emotion-words.

The query determining module 210 determines a query using the subset of the emotion-words and the at least one emotion. The songs retrieval module 210 retrieves songs that match any of words in the query. The songs may be retrieved from music libraries based on domain knowledge and one or more extracted emotions.

The song ranking module 212 ranks the songs that are retrieved by computing a similarity metric between the tag for each song, and a topic that is relevant to the extracted text.

The topic extraction module 214 extracts one or more topics from the text using a topic modelling technique. The topics may be, for example, War, Science, Politics, Bright day, Fragrant grass, etc. The second trained machine learning model 112 is trained to predict one or more tags for each song when tags are not already available for any song. The second trained machine learning model 112 is trained by correlating historical songs with historical tags.

The background music recommendation module 216 recommends background music based on top-ranked songs for the extracted text from the book and the topic that is relevant to the extracted text.

The database 220 may be a library of songs where relevant songs can be retrieved by making queries to the module. The database 220 may be an online or offline library.

Figure 3:
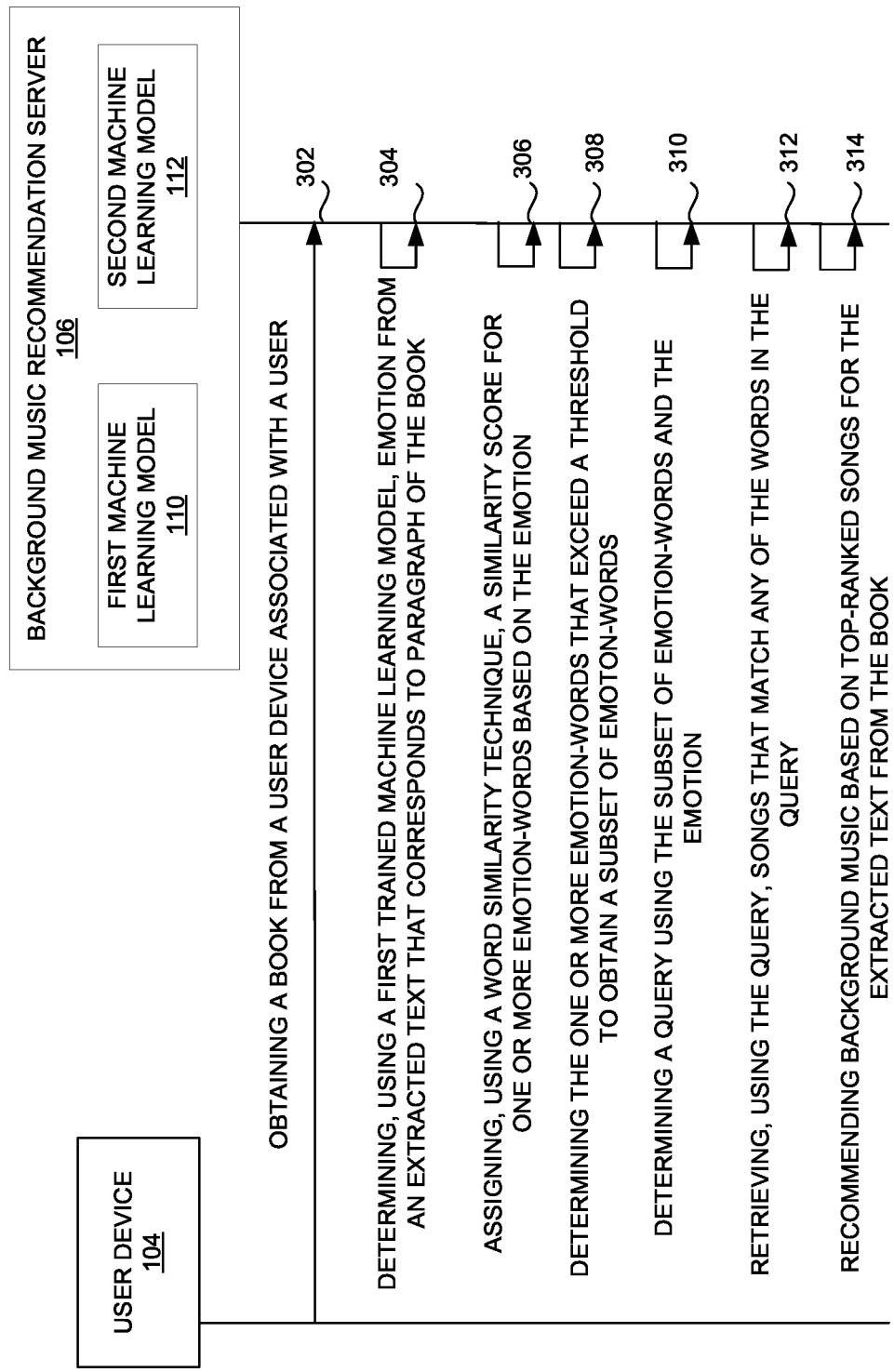
FIG. 3 illustrates an interaction diagram of a method for recommending background music that corresponds to an extracted text from a book based on emotion and a topic that is relevant to the extracted text using machine learning models according to some embodiments herein.

FIG. 3 illustrates an interaction diagram of a method for recommending background music that corresponds to an extracted text from a book based on an emotion and a topic that is relevant to the extracted text using machine learning models according to some embodiments herein. At step 302, the method includes obtaining a book from a user device associated with a user. At step 304, the method includes determining, using a first trained machine learning model, the emotion from the extracted text that corresponds to a paragraph of the book. At step 306, the method includes assigning, using a word similarity technique, a similarity score for one or more emotion-words based on the emotion. At step 308, the method includes determining the one or more emotion-words that exceed a threshold to obtain a subset of emotion-words. At step 310, the method includes determining a query using the subset of the emotion-words and the emotion. At step 312, the method includes retrieving, using the query, songs that match any of words in the query, each song includes at least one tag. At step 314, the method includes recommending background music based on top-ranked songs for the extracted text from the book.

Figure 4A:
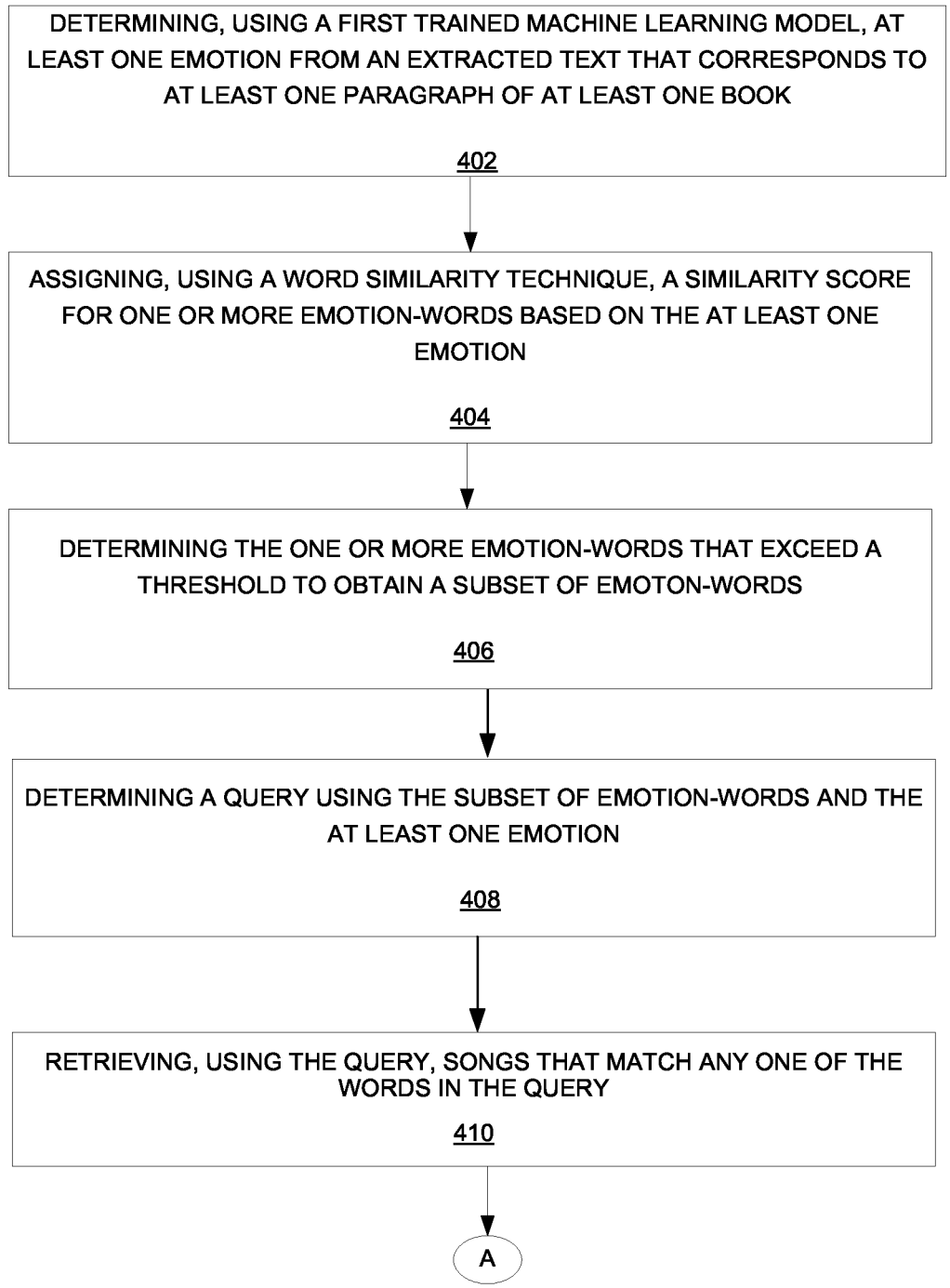
FIGS. 4A-4B illustrate a method for recommending background music that corresponds to an extracted text from a book based on emotion and a topic that is relevant to the extracted text using machine learning models according to some embodiments herein.
Figure 4B:
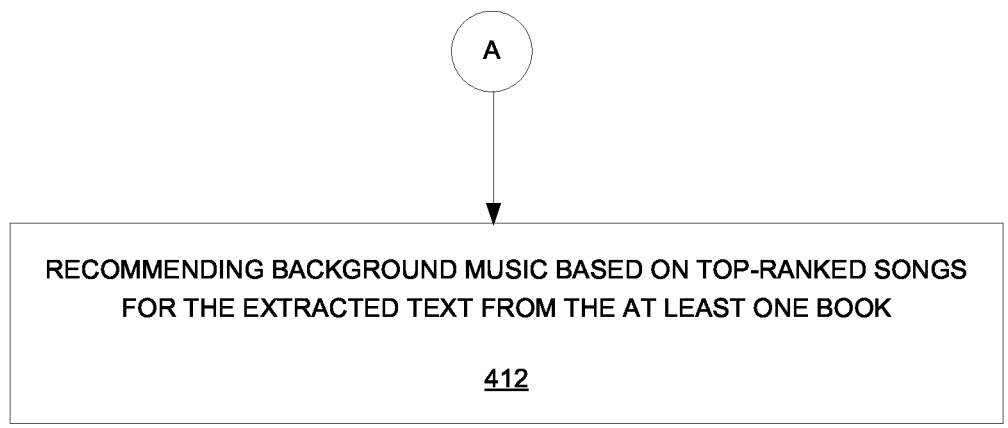

FIGS. 4A-4B illustrate a method for recommending background music that corresponds to an extracted text from a book based on an emotion and a topic that is relevant to the extracted text using machine learning models according to some embodiments herein. At step 402, the method includes determining, using a first trained machine learning model, the at least one emotion from the extracted text that corresponds to at least one paragraph of the at least one book. At step 404, the method includes assigning, using a word similarity technique, a similarity score for one or more emotion-words based on the at least one emotion. At step 406, the method includes determining the one or more emotion-words that exceed a threshold to obtain a subset of emotion-words. At step 408, the method includes determining a query using the subset of the emotion-words and the at least one emotion. At step 410, the method includes retrieving, using the query, songs that match any of words in the query, each song includes at least one tag. At step 412, the method includes recommending background music based on top-ranked songs for the extracted text from the at least one book.

In some embodiments, the method further comprises training the first machine learning model by correlating historical words with historical emotions to obtain the first trained machine learning model. The first maching learning model may extract the text at paragraph level, by understanding the context of the words used in a paragraph efficiently. The older machine learning models may analyze at word-level and fail to capture the true meaning of the context in which the words were used.

In some embodiments, the method further includes ranking, using a similarity metric mechanism, the songs that are retrieved by computing a similarity metric between the at least one tag for each song, and at least one topic that is relevant to the extracted text, the at least one topic of the extracted text is determined by a topic modelling technique.

In some embodiments, the similarity metric is computed by grouping a set of words into a plurality of groups, the plurality of groups are arranged in a hypernym hierarchy, the set of words are related to the one or more tags and the at least one topic.

In some embodiments, the similarity metric is computed on a pair of words that are selected from the set of words by, (a) selecting a pair of groups from the one or more groups in which the pair of words are present, (b) choosing a least common sub-sumer of the pair of groups to determine a depth of the least common sub-sumer of the pair of groups, and (c) calculating double the depth of the least common sub-sumer of the pair of groups to obtain a result and dividing the result by a sum of depths of the pair of groups.

In some embodiments, further includes training the second machine learning model by correlating historical songs with historical tags to obtain the second trained machine learning model.

Figure 5:
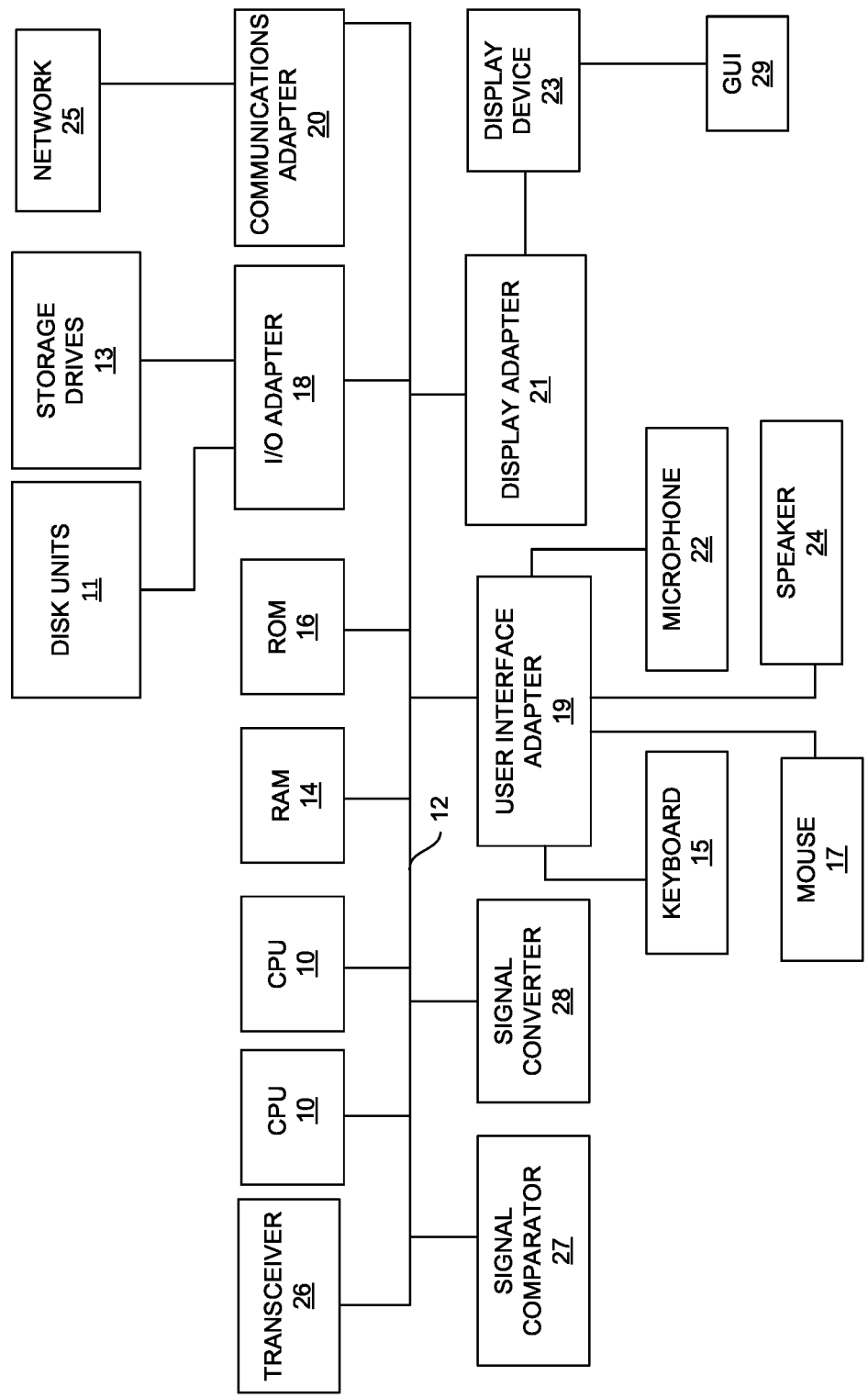
FIG. 5 is a schematic diagram of a computer architecture in accordance with the embodiments herein.

A representative hardware environment for practicing the embodiments herein is depicted in FIG. 5, with reference to FIGS. 1 through 4A-4B. This schematic drawing illustrates a hardware configuration of a background music recommendation server 106/computer system/computing device in accordance with the embodiments herein. The system includes at least one processing device CPU 10 that may be interconnected via system bus 12 to various devices such as a random-access memory (RAM) 14, read-only memory (ROM) 16, and an input/output (I/O) adapter 18. The I/O adapter 18 can connect to peripheral devices, such as disk units 38 and program storage devices 13 that are readable by the system. The system can read the inventive instructions on the program storage devices 13 and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 42, and a display adapter 21 connects the bus 12 to a display device 23, which provides a graphical user interface (GUI) 29 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for recommending background music that corresponds to an extracted text from at least one book based on at least one emotion and at least one topic that is relevant to the extracted text using machine learning models, the method comprising:
    determining, using a first-trained machine learning model, the at least one emotion from the extracted text that corresponds to at least one paragraph of the at least one book, wherein the first machine learning model is trained by correlating historical words with historical emotions to obtain the first trained machine learning model;
    assigning, using a word similarity technique, a similarity score for a plurality of emotion words based on the at least one emotion;
    determining the plurality of emotion words that exceed a threshold to obtain a subset of emotion-words;
    determining a query using the subset of the emotion-words and the at least one emotion;
    retrieving, using the query, songs that match any one of words in the query, wherein each song comprises at least one tag; and
    recommending background music based on top-ranked songs for the extracted text from the at least one book, wherein the songs are ranked using a similarity metric mechanism, wherein the songs are retrieved by computing a similarity metric between the at least one tag for each song, and at least one topic that is relevant to the extracted text, wherein the at least one topic of the extracted text is determined by a topic modelling technique, wherein the similarity metric is computed by grouping a set of words into a plurality of groups, wherein the plurality of groups are arranged in a hypernym hierarchy, wherein the set of words are related to the plurality of tags and the at least one topic, wherein the similarity metric is computed on a pair of words that are selected from the set of words by,
        selecting a pair of groups from the plurality of groups in which the pair of words are present;
        choosing a least common sub-sumer of the pair of groups to determine a depth of the least common sub-sumer of the pair of groups; and
        determining the similarity metric by calculating double the depth of the least common sub-sumer of the pair of groups to obtain a result and dividing the result by a sum of depths of the pair of groups.

2. A system for recommending background music that corresponds to an extracted text from at least one book based on at least one emotion and at least one topic that is relevant to the extracted text using machine learning models, the system comprising:
a processor; and
a memory that stores a set of instructions, which when executed by the processor, causes it to perform:
determining, using a first trained machine learning model, the at least one emotion from the extracted text that corresponds to at least one paragraph of the at least one book, wherein the first machine learning model is trained by correlating historical words with historical emotions to obtain the first trained machine learning model;
assigning, using a word similarity technique, a similarity score for a plurality of emotion-words based on the at least one emotion;
determining the plurality of emotion-words that exceed a threshold to obtain a subset of emotion-words;
determining a query using the subset of the emotion-words and the at least one emotion;
retrieving, using the query, songs that match any one of words in the query, wherein each song comprises at least one tag; and
recommending background music based on top-ranked songs for the extracted text from the at least one book, wherein the processor is configured to rank, using a similarity metric mechanism, the songs that are retrieved by computing a similarity metric between the at least one tag for each song, and at least one topic that is relevant to the extracted text, wherein the at least one topic of the extracted text is determined by a topic modelling technique, wherein the similarity metric is computed by grouping a set of words into a plurality of groups, wherein the plurality of groups are arranged in a hypernym hierarchy, wherein the set of words are related to the plurality of tags and the at least one topic, wherein the similarity metric is computed on a pair of words that are selected from the set of words by,
selecting a pair of groups from the plurality of groups in which the pair of words are present;
choosing a least common sub-sumer of the pair of groups to determine a depth of the least common sub-sumer of the pair of groups; and
determining the similarity metric by calculating double the depth of the least common sub-sumer of the pair of groups to obtain a result and dividing the result by a sum of depths of the pair of groups.

3. A non-transitory computer-readable storage medium storing a sequence of instructions, which when executed by a processor, causes performing a method for recommending background music that corresponds to an extracted text from at least one book based on at least one emotion and at least one topic that is relevant to the extracted text using machine learning models, the method comprising:
determining, using a first trained machine learning model, the at least one emotion from the extracted text that corresponds to at least one paragraph of the at least one book, wherein the first machine learning model is trained by correlating historical words with historical emotions to obtain the first trained machine learning model;
assigning, using a word similarity technique, a similarity score for a plurality of emotion-words based on the at least one emotion;
determining the plurality of emotion-words that exceed a threshold to obtain a subset of emotion-words;
determining a query using the subset of the emotion-words and the at least one emotion;
retrieving, using the query, songs that match any of words in the query, wherein each song comprises at least one tag; and
recommending background music based on top-ranked songs for the extracted text from the at least one book, wherein the songs are ranked using a similarity metric mechanism, wherein the songs are retrieved by computing a similarity metric between the at least one tag for each song, and at least one topic that is relevant to the extracted text, wherein the at least one topic of the extracted text is determined by a topic modelling technique, wherein the similarity metric is computed by grouping a set of words into a plurality of groups, wherein the plurality of groups are arranged in a hypernym hierarchy, wherein the set of words are related to the plurality of tags and the at least one topic, wherein the similarity metric is computed on a pair of words that are selected from the set of words by,
selecting a pair of groups from the plurality of groups in which the pair of words are present;
choosing a least common sub-sumer of the pair of groups to determine a depth of the least common sub-sumer of the pair of groups; and
determining the similarity metric by calculating double the depth of the least common sub-sumer of the pair of groups to obtain a result and dividing the result by a sum of depths of the pair of groups.

* * * * *